United States Patent
Winowiecki

(10) Patent No.: US 6,753,373 B2
(45) Date of Patent: Jun. 22, 2004

(54) POLYOLEFIN COMPOSITIONS AND METHOD OF USE THEREOF IN MOLDED PRODUCTS

(76) Inventor: Kris W. Winowiecki, 9106 Blueberry Hill, Howell, MI (US) 48843

( * ) Notice: Subject to any disclaimer, the term of this patent is extended or adjusted under 35 U.S.C. 154(b) by 0 days.

(21) Appl. No.: 10/176,008

(22) Filed: Jun. 20, 2002

(65) Prior Publication Data

US 2003/0236352 A1 Dec. 25, 2003

(51) Int. Cl.$^7$ ................................................. C08J 3/34
(52) U.S. Cl. ........................ 524/444; 524/445; 524/492; 524/493
(58) Field of Search ................................ 524/444, 445, 524/492, 493

(56) References Cited

U.S. PATENT DOCUMENTS

| | | |
|---|---|---|
| 4,727,112 A | 2/1988 | Kohyama et al. |
| 4,727,113 A | 2/1988 | Kohyama et al. |
| 4,886,849 A | 12/1989 | Hwo et al. |
| 4,889,885 A | 12/1989 | Usuki et al. |
| 5,362,782 A | 11/1994 | McCullough et al. |
| 5,552,469 A | 9/1996 | Beall et al. |
| 5,578,672 A | 11/1996 | Beall et al. |
| 5,698,624 A | 12/1997 | Beall et al. |
| 5,747,560 A | 5/1998 | Christian |
| 5,866,645 A | 2/1999 | Pinnavaia et al. |
| 5,952,093 A | 9/1999 | Nichols |
| 5,952,095 A | 9/1999 | Beall et al. |
| 5,962,553 A | 10/1999 | Ellsworth |
| 5,973,053 A | 10/1999 | Usuki et al. |
| 5,993,769 A | 11/1999 | Pinnavaia et al. |
| 6,017,989 A * | 1/2000 | Malm et al. ................. 524/440 |
| 6,057,396 A | 5/2000 | Lan et al. |
| 6,103,817 A | 8/2000 | Usuki et al. |
| 6,121,361 A | 9/2000 | Usuki et al. |
| 6,126,734 A | 10/2000 | Beall et al. |
| 6,228,903 B1 | 5/2001 | Beall et al. |
| 6,242,500 B1 | 6/2001 | Lan et al. |
| 6,261,640 B1 | 7/2001 | Pinnavaia et al. |
| 6,271,298 B1 | 8/2001 | Powell et al. |
| 6,287,634 B1 | 9/2001 | Beall et al. |
| 6,300,419 B1 | 10/2001 | Sehanobish et al. |
| 6,365,661 B1 | 4/2002 | Fisher et al. |
| 6,458,879 B1 * | 10/2002 | Grutke et al. ................ 524/442 |
| 6,500,892 B1 * | 12/2002 | Bishop et al. ............... 524/445 |

OTHER PUBLICATIONS

Reinforced Plastics 14, 327–333 (1989).
Plastics Technology, p. 74, (Oct. 1999) Leaversuch et al.

* cited by examiner

*Primary Examiner*—Nathan M. Nutter
(74) *Attorney, Agent, or Firm*—Ian C. McLeod

(57) ABSTRACT

A polyolefin composition substantially free of elastomers (plasticizers), preferably crystalline polypropylene, modified by mixing with polybutene-1 and containing an exfoliated inorganic nanocomposite and a coupling agent is described. The composition is adapted to be used with pigments to make finished molded products which have an appearance of paint covered by a clear coat and which are scratch resistant and have good low temperature (−30° C.) impact properties.

17 Claims, No Drawings

POLYOLEFIN COMPOSITIONS AND METHOD OF USE THEREOF IN MOLDED PRODUCTS

BACKGROUND OF THE INVENTION (1) Field of the Invention

The present invention relates to novel polyolefin compositions particularly free of elastomers (plasticizers) comprising a polyolefin, polybutene-1, exfoliated nanocomposites and a coupling agent which links the components together. In particular, the present invention relates to polyolefin compositions comprising polypropylene, polybutene-1 an exfoliated nanocomposite clay and the coupling agent. The polyolefin compositions are used with color pigments to produce molded products with a surface which has an appearance of clear-coated paint film.

(2) Description of Related Art

Crystalline polypropylene polymers are well known in the prior art. Isotactic, syndiotactic and atactic forms are described in U.S. Pat. No. 6,300,419 to Sehanobish et al. It can be a homopolymer or a copolymer with another olefinic polymer.

Crystalline polybutene-1 and blends with polypropylene are described in U.S. Pat. Nos. 4,727,112 and 4,727,113 to Kohyama et al; U.S. Pat. No. 4,886,849 to Hwo et al. These blends have good physical properties.

The use of intercalated and exfoliated layered nanocomposites in polymers to increase strength and heat resistance is well known to those skilled in the art. Illustrative are U.S. Pat. No. 4,889,885 to Usuki et al, U.S. Pat. Nos. 5,993,769, 6,261,640, 5,866,645 to Pinnavaia et al, U.S. Pat. No. 6,242,500 to Lan et al, U.S. Pat. Nos. 6,228,903, 6,057,396, 6,287,634, 5,698,624, 5,578,672, 5,552,469 to Beall et al, U.S. Pat. No. 6,271,298 to Powell et al and U.S. Pat. Nos. 6,121,361, 5,973,053, 6,103,817, and 6,126,734 to Usuki et al. U.S. Pat. No. 6,365,661 to Fischer et al, U.S. Pat. No. 5,962,553 to Ellsworth, U.S. Pat. No. 5,952,095 to Beall et al, U.S. Pat. No. 5,952,093 to Nichols, U.S. Pat. No. 5,747,560 to Christian. All of these patents are incorporated by reference.

U.S. Pat. No. 6,017,989 to Malm et al describes polyolefins modified by an elastomer (plasticizer) which with pigments are used in automotive molded products. The combination in an unpigmented polymer has a haze level of less than 50% as measured by ASTM D-1003-95. Special effects pigments, whether metallic or pearlescent, are described as being particularly suitable for these polyolefin compositions. The problem is twofold: first, the compositions lose strength because of the elastomer and second, the elastomer contributes to a softer surface, which is thus more easily scratchable. It has been thought that the elastomer was essential to make the part non-brittle at temperatures ranging down to −40° C.

OBJECTS

It is therefore an object of the present invention to provide polyolefin compositions which have a very low haze level, which are non-brittle at low temperatures, without the use of an elastomer, and which have significant strength. It is further an object of the present invention to provide polyolefin compositions which are economical to prepare and which are easily thermoformable. These and other objects will become increasingly apparent by reference to the following description.

SUMMARY OF THE INVENTION

The present invention relates to a thermoplastic composition substantially free of elastomers which comprises in admixture:

(a) a crystalline polybutene-1 in an amount between about 0.1 and 20% by weight;

(b) a crystalline polyolefin other than the polybutene-1 having haze of less than about 10% and a luminous transmittance of at least about 80% as measured by ASTM D1003 95;

(c) an exfoliated layered inorganic nanocomposite derived from a precursor nanocomposite with nanolayers and galleries between the nanolayers in an amount between about 0.1 and 5% by weight, wherein the nanocomposite has been exfoliated by (a), (b) or a mixture of (a) and (b);

(d) a coupling agent which couples (a), (b) and (c) together in an amount up to about 10% by weight, wherein the composition when molded without pigments has the haze and the luminous transmittance of (b). Preferably the polyolefin is polypropylene. Preferably the composition contains a color pigment. Preferably the composition is as a formed molded product. Preferably the composition is as a body part for a vehicle. Most preferably the composition is as a body part for a vehicle which duplicates a paint color of the vehicle. Preferably the precursor nanocomposite contains an exfoliating agent which is an organic onium ion for exfoliation by (a) and (b). Preferably the precursor nanocomposite contains an exfoliating agent which links the exfoliated nanocomposite to (a) and (b). Preferably the nanocomposite has a particle size of between about 1 and 100 microns. Preferably the composition as pellets formable into a molded product. Preferably the precursor nanocomposite is a 2:1 layered silicate with a particle size between about 1 and 100 nanometers and contains an organic quaternary ammonium ion between the layers.

The present invention also relates to a method for the preparation of a molded part which comprises:

(a) providing a thermoplastic composition substantially free of elastomers which comprises in a mixture: a crystalline polybutene-1 in an amount between about 0.1 and 20% by weight;

a crystalline polyolefin other than the polybutene-1 having haze of less than about 10% and a transmission of at least about 80%;

an exfoliated layered inorganic nanocomposite derived from a precursor nanocomposite with nanolayers and galleries between the nanolayers in an amount between about 0.1 and 5% by weight, wherein the nanocomposite has been exfoliated by (a), (b) or a mixture of (a) and (b);

a coupling agent which couples (a), (b) and (c) together in an amount up to about 10% by weight, wherein the composition when molded without pigments has the haze and the luminous transmittance of (b); and (b) forming the molded part so that the part without color pigments has a haze of less than 10% and a luminous transmittance of at least about 80%. Preferably the composition contains a color pigment. Preferably the composition in step (a) has been mixed in a compounding extruder and then injection molded in a screw injection molding machine as a molded product. Most preferably the composition in step (a) is mixed in the extruder without the color pigment, cut into pellets and then injection molded as an article with the pigment.

The present invention further relates to a recycled polyolefin composition which comprises: a particulate comprising a ground molded product of the thermoplastic composition as previously described.

The present invention also relates to a method of recycling a polyolefin composition which comprises:

(a) providing a first molded product of a thermoplastic composition as previously described;

(b) reducing the molded product to a particulate; and (c) molding the particulate into a second molded product.

As used herein the phrase "substantially free" in relation to the elastomer means usually less than one percent (1%) of the total weight of the composition. The amount of any elastomer used cannot reduce the scratch resistance of the resulting molded product. As used in the present invention the term "polyolefin composition" or "thermoplastic polyolefin composition" means a mixture of the components in the form of pellets which are non-pigmented, pigmented pellets, unpigmented molded products and pigmented molded products.

The term "molded product" refers to a part which has been subjected to heat and pressure to form an article of manufacture with a distinctive shape.

The polyolefin compositions of the present invention are free of elastomers (plasticizers) which tend to make the molded products more scratch resistant. Surprisingly the molded products have very good low temperature properties in absence of the elastomers (plasticizers). The molded products are flexible and strong. The molded products appear as if they were covered with a conventional paint which had been clear coated in the conventional manner and thus are color matched to such finishes, such as on automobiles. The products are useful in setting where a decorative finish is required.

The polyolefin composition and polybutene-1 are typically sold without the pigment. In the molding plant the pigment is added to the polyolefin composition and then injection molded in a mold with a very high finish to form the molded product. This method allows the user to change pigments (color compositions) which are stored in relatively small containers. The need for large silos of single color pigmented polyolefin compositions is thus eliminated.

More specifically, the invention relates to automotive exterior/interior automotive vehicle component such as body side moldings/claddings as well as various interior components such as: A, B, C pillars, and glove box covers, various bezels manufactured with this material and color matched with such pigmentation to perfectly match an automotive exterior and interior paint chips, and a method to recycle such components.

The automotive industry has worked for decades to increase fuel efficiency of vehicles by replacing a significant amount of steel once used to manufacture vehicles by lighter parts made out of plastic materials. The industry has moved toward recycling components of vehicles in order to reduce consumption of natural resources. Modern thermoplastics have improved physical properties impact strength for a bumper and can be recycled.

While the function of modern thermoplastics have been improved, there still is a need to match the quality of a painted surface in terms of depth of color and gloss. Matching a full color palette has been difficult in the past because of the color palette including metallics and special effect pigments. In addition, the vehicle is expected to have the highest quality of depth of color and high gloss. In the past, exterior body panels have either been painted or laminated with a film in order to match the paint chip. However, there are a number of problems relating to these methods of achieving a good color match: 1) The uneven distribution of the coating film; 2) The VOC given off during the coating process; 3) Cracking of the film at low temperatures; 4) Limited flexibility of the film at low temperatures; and 5) Excess of film during the laminating process, for instance. The present invention provides an exterior molded product for automotive use that matches a paint chip in depth of color and of high gloss without the cost and warranty issues involving the painting or laminating.

The compositions of the present invention are scratch resistant per Chrysler specification LP-463DD18-01. A sample shall be scratched by a 1 mm pin: 1 pass by the following force in newtons:

2N

3N 4.5N

6N

7N

*Note: Samples shall be evaluated with a rating of 1 through 5,

1=no scratch

5=severe scratch line.

Maximum allowed scratch severity—rating of 2 for 7N force. The preferred composition had a rating of 2 for a 7N force, and the ability to remove scratches and mars with car polish is noteworthy. With the products of the present invention even small scratches can be easily removed with conventional automotive polish containing a very fine grit abrasive. There is an advantage over a painted clear coat since the pigment is throughout the molded product.

DESCRIPTION OF PREFERRED EMBODIMENTS

The term "crystalline" means that the polymers and the product have a regular crystal structure which is shown by x-ray diffraction lines. Crystalline polymers provide a very good base for the colorants used in the compositions of the present invention.

The term "elastomer" means a rubbery or elastic material. In general these materials are avoided in the present invention, since they reduce the scratch resistance of the exposed surfaces of the final product. The compositions of the present invention have very good low temperature properties as measured by an Izod impact test at −30° C.

The term "coupling agent" means a compound which serves to bind the polymers to the filter. Coupling agents can be organic anhydride polymers, which are preferred, organic silanes, organic aluminates, organic titanate, organic boron compounds, organic zircoaluminates for instance. See also U.S. Pat. No. 5,459,205 wherein active hydrogen coupling agents are described. The coupling agents are preferably reactive with the nanocomposites used in the present invention, so that the organic group on the coupling agent can bind with the polymer. Coupling agents are described in Engineered Materials Handbook of Engineered Plastics (ASTM) Vol 2, 12, 499–500; in Reinforced Plastics 14, 327–333 (1989), and in Organofunctional Silanes 3, 65 to 74 (1999).

The term "nucleating agent" means a compound which promotes crystallinity in the polymer. They can also perform the function of clarifying the polymer (See Plastics Technology, page 74 October 1999). Such compounds include aromatic carboxylic acids and their derivatives, e.g. sodium benzoate, aluminum p-tert-butyl benzoate and aluminum benzoate; metal organic phosphates, e.g. sodium di(4-t-butyl phenyl)phosphate and other aromatic phosphates; benzylidine sorbitol derivatives; talc; polyvinyl cycloalkanes, e.g. polyvinyl cyclohexane and organic dicarboxylic acid derivatives, e.g. sibacic acid. These compounds are well known to those skilled in the art as exemplified by U.S. Pat. No. 5,362,782 to McCullough et al, the Amfine Literature and Leaversuch, R. D. et al. 50–53 (August 1998).

The monomers from which the polyolefins of the present invention is derived and used in preparing the present invention are preferably $C_2$ to $C_{20}$ olefins. Examples of the $C_2$ to $C_{20}$ alpha-olefins include ethylene, propylene, 1-butene, 2-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene, vinylnorbornene, cyclooctadiene, dicyclooctadiene, methylenenorbornene, 5-methylene-2-norbornene, 5-methyl-1,4-hexadiene, and 7-methyl-1,6-octadiene. The polyolefins can be used alone or in combination.

The polyolefins are crystalline. In any event, they need to have the low haze and high luminous transmittance, as previously described.

The "crystalline polypropylenes" preferably used in the present invention are well known, have a crystal structure and can be prepared and characterized as described in, for instance, U.S. Pat. No. 6,300,419 to Sehanobish et al, which is incorporated herein by reference. Pre-polymerized polypropylene is typically crystallized with a nucleating agent. Typically the melt flow rate by ASTM 1238 is between about 0.1 and 100 grams per 10 minutes for the crystalline polypropylene which is used as a component in the present invention.

The separate "crystalline polybutene-1" component used in the present invention is well known and has a crystal structure as described and characterized for instance in U.S. Pat. Nos. 4,727,113, 4,727,112, and 4,886,849, which are incorporated herein by reference. The polybutene-1 typically has a flow rate of between about 0.1 and 100 grams per 10 minutes for the purpose of the present invention.

The preferred crystalline polypropylene and/or polybutene-1 can contain small amounts of other polymerized vinyl monomers so long as they do not contribute haze or reduce luminous transmittance as measured by a Hazemeter as described in ASTM D-1003-95. Such polymers include the polyolefins described previously. Typically the haze level of the crystalline polypropylene used in the present invention is less than 10%, preferably less than 1% and most preferably less than 0.2% as tested by ASTM D-1003-95. A luminescent transmittance of more than 80% and preferably greater than 90% also measured by ASTM D-0003-95 is also required. The thickness of the test specimen is typically 40 to 60 mils (0.040 to 0.060 inch) for the ASTM test (i.e. a film).

The exfoliated nanocomposite of the present invention is derived from precursor nanocomposite galleries which have been intercalated with the polyolefin and/or polybutene-1 by shear mixing. Such nanocomposites are commercially available and generally contain organic or inorganic compounds in the galleries which are compatible with the polymers being intercalated and which expand upon shear mixing. The preferred nanocomposites contain organic onium compounds in the galleries and are available from Nanocor, Arlington Heights, Ill. as the "P" series for use with polyolefin resins to increase strength (see P-808 Technical Data). These nanocomposites are surface modified montmorillonite of minerals. These are generally classed as 2:1 layered silicates. The use of nanocomposites for strength in polyolefins is described for instance in U.S. Pat. No. 4,889,885. Further, the nanocomposites are described in the U.S. patents cited under Related Art. All of these patents are incorporated herein by reference herein. The nanocomposite preferably has a particle size between 1 and 100 microns.

The coupling agent links the "polyolefins", polybutene-1 and nanocomposite together. The result is a polymer composition with flexibility and strength. The bonds can be covalent, ionic or by intermingling. The reactions can be with available hydroxyl (HO) groups in the polyolefin polymers and with functional groups in the nanocomposite. Typically the coupling agent has at least one group which is reactive with the polypropylene, polybutene-1 and/or the nanocomposite. The coupling agent at the levels used must not significantly increase the haze or decrease luminous transmittance of the polymer composition.

The preferred coupling agents are polymers of carboxylic anhydrides of diacids containing 3 to 20 carbon atoms and which do not increase the haze level in or reduce the luminous transmittance of the composition. The preferred coupling agent is based upon maleic anhydride which is unsaturated in the ring making it easily reactive and which does not impart haze or reduced luminous transmittance in the composition. The anhydrides react without generating water as a byproduct which can contribute to haze and reduce luminous transmittance. Less preferred as coupling agents are polymers of diacids containing 3 to 20 carbon atoms. The diacids can contribute to haze and reduced luminous transmittance.

Preferred polyolefin composition of the present invention is comprised of a crystalline polypropylene Metallocene homopolymer with a melt flow index from 0.1 to 35 g/10 min. and ranging from 70 to 92% by weight; a polybutene-1 polymer with a melt flow from 0.4 to 20 g/10 min. at about 4.5 to 20% by weight, a maleic anhydride coupling agent at about 0.5 to 5% by weight, a nanocomposite at about 0.1 to 5% by weight. Another preferred component in this composition is one or more nucleating/clarifying agents in an amount ranging from 0.1 to 0.5% by weight. Also included in the composition is an endothermic foaming agent in an amount between 0.5 to 1.0% by weight and finally special effects pigments. At process temperatures, the foaming agent decomposes carbon dioxide, creating a fine dispersed microcellular structure in the polymer. This integrated foam structure provides a number of advantages including eliminating cooling sink marks, relieving internal mechanical stress, reducing thermal conductivity and improving surface finishes. A fine microcellular structure allows for lower density without adversely affecting desirable physical properties.

In another embodiment, the invention provides a method for recycling an automotive vehicle by manufacturing a first exterior component, securing it to an automotive vehicle, removing it after the life of the vehicle, grinding it, injection molding it into another second exterior component.

In particular:

Component 1: The most preferred polyolefin is that of propylene, and polybutene-1 homopolymers, and co-polymers. Metallocene based homopolymer polypropylenes are preferred in the invention. Metallocene catalyzed polypropylene homopolymers have excellent optical properties. The Metallocene homopolymer polypropylene of choice has a very low haze level of 8–10% as measured by a 40 mil plaque in ASTM D-1003-95. The Metallocene homopolymer polypropylene also has very low extractables of 1 to 1.5% as compared to another Metallocene based polypropylene of the Ziegler-Nather catalyzed polypropylene which has 2 to 3% extractables. Another property of the preferred Metallocene based polypropylene is a high HDT (heat deflection temperature) as measured by ASTM D648 of 225 F.

Another Metallocene based polymer is an isotactic copolymer of polypropylene. Isotactic polymers (I-PP) tend to be more crystalline in nature, than for example the syndiotactic Metallocene polymers (s-PP). The s-PP is more rubbery like and has a lower flex modulus than the Isotactic polypropylene polymers. The I-PP has a very low haze level of 0.2% as measured by ASTM D1003 test method. The I-PP has a gloss level of 98% as measured by ASTM D-2457.

The useful compositions comprise of low haze, transparent thermoplastic polybutene-1 modified polyolefins with special effects pigments uniformly distributed within the matrix. Preferably they are manufactured into exterior automotive components. This composition can also be manufactured into a body side molding/cladding or bumper fascias.

The polyolefins are preferably aliphatic polyolefins. In automotive applications, the compositions must have excellent outdoor weathering characteristics. Exterior automotive components must meet OEM (original equipment manufacturing) standards for accelerated testing as tested to SAE J1960 and certain long term outdoor weathering in Florida and Arizona.

The polyolefin component of the invention preferably comprise of homopolymers or co-polymers of polyethylene, polypropylene, 1-butene, 2-butene, 1-pentene, 1-octene. Of these, polyethylene and polypropylene homopolymers and co-polymers are preferred.

Metallocene-catalyzed polyolefins are characterized by a narrow molecular weight distribution. Metallocene-catalyzed polyolefins also exhibit excellent optical clarity. Preferred sources of Metallocene polyolefins are ExxonMobil ACHIEVE polymers, and AtoFina, both located in Texas.

Component 2: The polyolefins are modified with polybutene-1, coupling agents, and nanocomposites. The haze of the polyolefin composition is less than 10%, and the transparency (luminous transmittance) is at least 80% without the pigments. The composition generally includes special effects pigments, such as aluminum flake or pearlescent pigments, preferably transparent pigments.

The present invention provides a polybutene-1 modified polyolefin when molded having high transparency and low haze when unpigmented, and when pigmented and molded can match a paint chip in gloss level and depth of color without the cost and warranty issues of painting. The molded product has excellent physical properties such as excellent outdoor weathering, flexibility, scratch resistance, impact strength, and good chemical resistance.

The polyolefin composition, because of its high transparency and low haze value, can be color matched to a wide variety of paint chips including a metallic paint chip. The polyolefin composition also provides a molded product with excellent scratch resistance as measured by the automobile industry standard "5-finger" scratch test. The molded product is comparable in scratch resistance to current two component polyurethane coatings which are difficult to prepare. The preferred molded product also has excellent outdoor weathering characteristics as tested to accelerated weathering Xenon J1960 specification. A very high gloss level of at least 90% measured by a gloss meter at a 60° angle can also be achieved and as high as 95% has been achieved with the molded products.

The semi-crystalline highly Isotactic polybutene-1 polymer is derived from the Ziegler-Natter type of catalyst of butene-1. The structure is as follows:

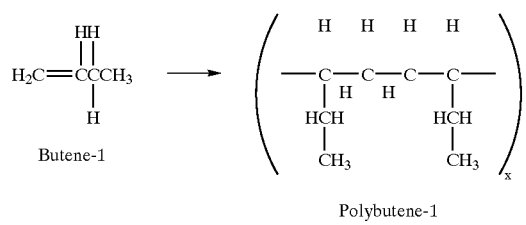

Polybutene-1

A unique attribute of the polybutene-1 is to form polymorphs.

|  | Initial Properties | 7–10 days Properties |
|---|---|---|
| Hardness: | 39 D | 55 D |
| Tensile Stress: | 4 MPa | 15 MPa |
| Tensile Modulus: | 200 MPa | 250 MPa |

The tetragonal (metastable state) is formed and then within 7–10 days form another state called a Hexagonal state is formed. The Hexagonal state is preferred because the surface hardens, tensile strength increases and tensile modulus increases.

The present invention preferably has polybutene-1 ranging from 0.1 to 20.0% by weight. The optimum percent polybutene-1 at 4.5% to 10% by weight for body side/cladding applications. The preferred source of polybutene is from Basell Polyolefins located in Lansing, Mich.

The key attributes of polybutene-1 include: excellent low temperature impact properties, high clarity, low fogging tendency, superior toughness, good abrasion resistance, excellent creep resistance and tear strength. The transformation into a harder surface state after injection molding is desirable for automotive exterior/interior parts as well as many non-automotive parts.

Component 3: The third component of this invention is a coupling agent. The preferred coupling agents are grafted polymers of maleic anhydride. Coupling agents have been designed to add polarity to the polypropylene to improve the reactivity of glass fibers or inorganic fillers.

The coupling agent improves physical properties such as stiffness, elongation, impact strength, and flow. The following Table 1 indicates how a 30% glass fiber in a polypropylene mixture changes with the addition of the polymer of maleic anhydride as the coupling agent:

TABLE 1

|   | Flex Modulus | Tensile Strength | Elongation at Break |
|---|---|---|---|
| 1. Without CA | 5,500 MPA | 95 MPa | 3% |
| 2. With CA | 5,700 MPa | 100 MPa | 3.25% |

In the molded product the coupling agent coats the nanocomposite particles and allows easier dispersion and improved adhesion to the polypropylene matrix. An acrylic acid based coupling agent was ruled out because it caused the formulation to become cloudy, and lose its high transparency and low haze qualities. The best coupling agent to maintain low haze levels and high transparency is the maleic anhydride type. The coupling agent of choice is from ExxonMobil known as EXXELOR at levels between 0.1 to 5.0%

Component 4: Component four in the polyolefin composition is the nanocomposite. With relatively low levels: (2 to 5%) as compared to regular filler levels of (20 to 30%) one can achieve significant gains in physical properties. Because of these low loadings, plastic compositions using nanocomposites can maintain low specific gravities, good flow characteristics, as well as high transparency (luminous transmittance) and low haze. Nanocomposites also promote rapid crystallization. The increase in crystallization decreases cycle time and improves surface hardness. At just a 5% by weight loading of a nanocomposite the following physical properties can be improved. The following Table 2 shows a typical TPO (thermoplastic polyolefin) composition with nanocomposites, and one without:

TABLE 2

|   | Flex Modulus | Heat Deflection | Tensile Strength | CLTE |
|---|---|---|---|---|
| 1. Without Nanocomposite | 120,000 MPa | 150 F. | 7,250 MPa | 10 × 10$^{-5}$ mm/mm |
| 2. With Nanocomposites | 500,000 MPa | 230 F. | 11,800 MPa | 5.0 × 10$^{-5}$ mm/mm |

The nanocomposite is preferably a surface modified montmorillonite mineral. In terms of compounding, nanocomposites need higher shear in order to increase the exfoliation or aspect ratio. During the compounding stages, it was found that lower the compounding temperatures (~20° lower in all stages) to maintain colorless pellets, which in turn increased the torque level or mechanical shear. Mechanical shear is defined as: to become fractured under a load due to sliding action (50% torque in the BUSS™ (Bazel, Switzerland). The nanocomposite composition ranged from 0.1 to 5% by weight. The optimum loading is 0.5 to 1.0% by weight. The preferred nanocomposites supplier is Nanocor, Inc. in Arlington Heights, Ill.

Component 5: The fifth component is the nucleating agent. Nucleating agents tend to give a higher degree of crystallinity to polymers, resulting in increased mechanical properties. Some of the mechanical properties that are improved include a harder surface; higher flex modulus and improved optical properties, just to name a few. The hardness of the surface is most important. The nucleating agent raises the crystallinity temperature and provides a faster seed crystal start. The chemical structure of the nucleating/clarifying agent which is preferred having the structure

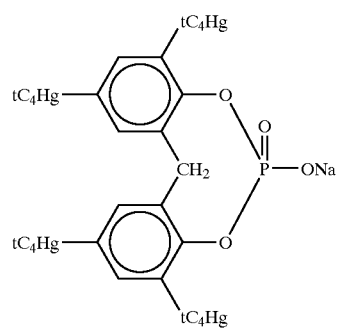

di(tetratertiary butylphenyl)phosphate (NA11 Amfine Chemical, Allendale, N.J.) As mentioned before, nucleating/clarifying agents give a higher degree of crystallinity to polymers, resulting in increased cycle times in an injection molding process. The following Table 3 indicates the effect of including a nucleating/clarifying agent into the polyolefin composition:

TABLE 3

|   | Flex Mod. | Izod Impact | heat deflection Temp. |
|---|---|---|---|
| 1. W/O Nucleating agent | 1250 MPa | 3.2 Kg-cm/.cm2 | 109 C. |
| 2. With Nucleating agent | 1700 MPa | 4.2 Kg-cm/cm2 | 130 C. |

|   | Crystallization Temp. | Rockwell Hardness | Gloss Index | Haze Value |
|---|---|---|---|---|
| 1. W/O Nucleating agent | 118 C. | 100 (HRR) | 90 | 58 |
| 2. With Nucleating agent | 130 C. | 110 (HRR) | 110 | 20 |

This is all done at relatively low usage levels: 0.1 to 0.5% by weight. Preferably, the usage level is 0.4% parts by weight of the total composition. The preferred source of nucleating/clarifying agents is Amfine Chemical Corporation located in Allendale, N.J.

Component 6: Another component that can be included in the plastic composition is an endothermic chemical foaming/processing agent. The endothermic foaming agent is described as a 50% acid carbonate and 50% of a polyolefin carrier mixture. The bubbles are formed by reaching a process temperature of between: 340F to 600F. Some of the benefits achieved by the use of this type of foaming/processing agent include: impact strength is improved; increased flow; reduced splay marks; color concentrate dispersion; reduced weight in the molded part and increased cycle times. One source of endothermic foaming agents is Endex Polymer Additives located in Ontario, Canada.

Component 7: The next component in the plastic composition is preferably the UV package. The UV package has the function to protect the surface of the molded product from being degraded by UV light, in other words in outdoor exposure. The examples of parts to be protected from outdoor exposure can be automotive exterior, and interior parts, and also non-automotive parts for ATVs, motorcycles, snowmobiles and the like.

UV absorbers, hindered amine light stabilizers, and antioxidants are used in the plastics industry to protect the finished molded parts from discoloring after exposure to UV sunlight. Typical loading levels are from 0.25% to 5% by weight. Examples of UV absorbers include benzophenones and benzotriazoles commercially available from a number of suppliers such as: BASF Corp., Mt. Olive, N.J., Ciba-Geigy Corp., Hawthorne, N.Y., and Witco Corp., Greenwich, Conn. Hindered amine light stabilizers are available commercially from Ciba-Geigy (Hawthorne, N.Y.) and Cytech. Antioxidants include alkylated phenols and bisphenols, alkylidene polyphenols, organic phosites and phosphates.

Component 8: U.S. Pat. No. 6,017,989 describes the importance of many types of pigments. The pigments used may be inorganic or organic. Special effects pigments including flake alone or in conjunction with color pigments achieve special effects such as a metallic appearances. Inorganic types of pigments include, titanium dioxide, carbon black, red iron oxide, black iron oxide, chromium oxide green, ultramarine blue. Useful organic pigments are metallized and non-metallized azo reds, quinacridone reds, anthraquinone reds, perylene reds, copper phthalocyanine blues and greens isoindolineone oranges and yellows, carbazole violet, for instance. Inorganic and organic pigments are commercially available from many sources including BASF Corporation in Mt. Olive, N.J., Cabot Corporation, Billerica, Mass., Ciba-Geigy Corp. Newport, Del., and Mineral Pigments Corporation in Beltsville, Md.

Special effects pigments are metallic flake and pearlescent pigments including aluminums, micas, gold bronze, copper, nickel, brass, magnesium, and zinc. These types of special effect pigments are available from many sources such as Silberline, Tamaqua, Penna, EM Industries, Hawthorne, N.Y. Micas are available from The Mearl Corporation, New York, N.Y., and EM Industries, Hawthorne, N.Y. The average particle size of the dispersed pigments, including the flake, is preferably less than one micron and more preferably less than 0.2 microns.

Color concentrates which include pigments and a carrier may be added in amounts of up to 14% by weight to the polymer composition, preferably between 4% and 10% by weight. Pigments are added in varying amounts to provide opacity. Pigments are dispersed in a carrier prior to being introduced into the polymer blend. Such carriers are typically high molecular weight polyethylene or polypropylene.

Heat and pressure are applied to the polymer compositions using various methods of processing can be applied such as thermoforming, extrusion, injection molding, and compression molding. The polymer compositions are formulated to have a wide range of melt flows to accommodate various processes. A wide range meaning from 2.0 to 35 g/10 in. As measured by ISO 1133. The polymer composition can be extruded into sheets such as the vinyl siding industry. The polymer composition can be injection molded into automobile exterior parts such as, but not limited to, body side moldings, claddings, ground effects, mirror housings, spoilers, interior/exterior door handles, and A,B,C, pillars on the interior. The polymer compositions can also be injection molded into non-automotive molded products such as, but not limited to, hoods for lawn equipment and snowmobiles, fenders for motorcycles and all terrain vehicles (ATV).

Automotive/non-automotive exterior components are particularly suitable for the recycling process due to the compatible nature of the polyolefins. In terms of the steps to recycle such component, the component is removed from the vehicle, fed through a shredder and ground up into "fines" or "particulates". The fines may be added to other polyolefins and reshaped through the injection molding process. The molded product can also be removed from the vehicle, shredded and ground up into "fines" and reshaped through the injection molding process without breaking down or affecting the metallic or pearlescent pigments.

EXAMPLE 1

Preparation of a Silver Frost Body Side/Cladding

The following materials are weighed into a 55 gallon drum, and then put onto a drum tumbler for 20 minutes: 92.7% by weight Achieve 1635 PP (a metallocene-catalyzed polypropylene available from ExxonMobil); 4.5% by weight PB 0400 homopolymer (a polybutene available from Basell); 1.0% EXXELOR PO 1020 (a coupling agent available from ExxonMobil); 0.5% I.30 P (a nanocomposite available from Nanocor); 0.4% NA-11 (a nucleating agent available from Amfine); 0.2% Cyasorb 2337 (available from Cytech Industries); 0.2% Cyasorb 3529 (available from Cytech Industries); 0.4% Cyasorb 3853sPP (available from Cytech Industries); 0.05% Cyanox 1741 (available from Cytech Industries); 0.05% GE 641 (available from GE).

The pellet/powder mix was then batch fed into one feeder into a 46 mm BUSS Kneader (Bazel, Switzerland) compounding extruder. The BUSS Kneader was set up as follows: zone 1: 175–155° C., zone 2: 180–160° C., zone 3: 185–165° C., zone 4: 190°–170° C. The torque reader was at 50%. The materials melted together, and produced high transparent, low haze extrudage. The extrudage was cooled by a water trough and then the strands were pelletized at a rate of 75 lbs/Hr.

Pigments: Silver Frost Color Concentrate: 5 parts medium aluminum flake pigment (available from Siberline, Tamaua, Pa.), 4 parts by weight of a white pearlescent concentrate (available from EM Industries); 1 part by weight of fine-flake silver concentrate, 0.15 by weight of a white concentrate, and 0.08 parts by weight of a russet pearlescent concentrate. These would be formed into a color concentrate pellet by a color house.

Material Properties: The following physical properties were obtained:

a) Transparency of at least 80% as measured by ASTM D1003 b) Haze value less than 10% as measured by ASTM D1003 c) High Gloss reading of 95% as measured by a gloss meter d) Excellent scratch resistance of a rating of 2 (visible line) using a 1 mm pin and a 7 N force tested to the Abrasion Resistance Spec: LP-463PB-54-01 e) Excellent UV protection a DE reading of <1.0 tested to SAE J1960 f) Excellent chemical resistance with a DE<1.0 tested to MS-JP9-8 g) Excellent CLTE of $6 \times 10^{-5}$ mm/mm as tested to ASTM E228 h) Low mold shrinkage of <0.8% tested to ISO 2577

Processing: The transparent/low haze polymer composition blend is used at 100 parts to 14 parts of the silver frost color concentrate. The two components, transparent/low haze polymer composition and the color concentrate pellet are then be blended together and then introduced into an injection molding machine which would have the following profile: zone 1: 410 F, zone 2: 420 F, zone 3: 430 F, zone 4: 440 F, nozzle temperature: 450 F. To achieve a highly glossy surface on the bodyside molding and cladding the mold should have a very high quality steel and be polished up to an A-3 mold level. A-3 polish on a steel surface is the highest quality polish one can achieve with a mirror-like reflection—diamond polish for hours. The mold temperature is as 90–100F. The cycle time has been 90 seconds.

EXAMPLE 2

Preparation of a Silver Frost Bumper Fascia

The following materials were weighed into a 55 gallon drum, and then put onto a drum tumbler for 20 minutes: ACCPRO 9934 (a metallocene-catalyzed highly crystalline polypropylene available from BP Amoco); 10–20% by weight PB 0400 homopolymer (a polybutene available from Basell); 1.0–5.0% EXXELOR PO 1020 (a coupling agent available from ExxonMobil); 0.5% I.30P (a nanocomposite available from Nanocor); 0.4% NA-11 (a nucleating agent available from Amfine); 0.2% Cyasorb 2337 (available from Cytech Industries); 0.2% Cyasorb 3529 (available from Cytech Industries); 0.4% Cyasorb 3853PP (available from Cytech Industries); 0.05% Cyanox 1741 (available from Cytech Industries); 0.05% GE 641 (available from GE).

The pellet/powder mix was then batch fed into one feeder into a 46 mm BUSS Kneader compounding extruder. The BUSS Kneader was set up as follows: zone 1: 155 C, zone 2: 160 C, zone 3: 165 C, zone 4: 170 C. The torque reader was at 50%. The materials melted together, and producing high transparent, low haze extrudate. The extrudate was cooled by a water trough and then the strands were pelletized.

Pigments: Silver Frost Color Concentrate: 5 parts medium aluminum flake pigment (available from Siberline, Tamaua, Pa.), 4 parts by weight of a white pearlescent concentrate (available from EM Industries); 1 part by weight of fine-flake silver concentrate, 0.15 by weight of a white concentrate, and 0.08 parts by weight of a russet pearlescent concentrate. These are usually formed into a color concentrate pellet by a color house.

Material Properties:
a) Transparency of at least 80% as measured by ASTM D1003
b) Haze value less than 10% as measured by ASTM D1003
c) High gloss of +90% as measured by a gloss meter
d) Excellent scratch resistance of a rating of 2 (visible line) using a 1 mm pin and a 7 N force tested to the Abrasion Resistance Spec: LP-463PB-54-01
e) Excellent UV protection a DE reading of <=1.0 tested to SAE J1960
f) Excellent chemical resistance with a DE<1.0 tested to MS-JP9-8
g) Excellent CLTE of $6 \times 10^{-5}$ mm/mm as tested to ASTM E228
h) Low mold shrinkage of <0.8% tested to ISO 2577

Processing: The transparent/low haze polymer composition blend is used at 100 parts to 14 parts of the silver frost color concentrate. The two components, transparent/low haze polymer composition and the color concentrate pellet are then blended together and then introduced into an injection molding machine which would have the following profile: zone 1: 410 F, zone 2: 420 F, zone 3: 430 F, zone 4: 440 F, nozzle temperature: 450 F. To achieve a highly glossy surface on the bumper fascia, the mold should have a very high quality steel and be polished up to an A-3 level. The mold temperature should be 90–100F. The cycle time has been 90 seconds.

EXAMPLE 3

Preparation of a Silver Frost Extruded Bodyside Molding

The following materials was weighed into a 55 gallon drum, and then put onto a drum tumbler for 20 minutes: Finocene 98-09(a metallocene-catalyzed polypropylene available from ATOFINA); 5.0% by weight PB 0400 homopolymer (a polybutene available from Basell); 1.0% EXXELOR PO 1020 (a coupling agent available from ExxonMobil); 0.5% I.30 P (a nanocomposite available from Nanocor); 0.4% NA-11 (a nucleating agent available from Amfine); 0.2% Cyasorb 2337 (available from Cytech Industries); 0.2% Cyasorb 3529 (available from Cytech Industries); 0.4% Cyasorb 3853PP (available from Cytech Industries); 0.05% Cyanox 1741 (available from Cytech Industries); 0.05% GE 641 (available from GE).

The pellet/powder mix was then batch fed into one feeder into a 46 mm BUS Kneader compounding extruder. The BUSS Kneader was set up as follows: zone 1: 155 C, zone 2: 160 C, zone 3: 165 C, zone 4: 170 C. The torque reader was at 50%. The materials melted together, and producing high transparent, low haze extrudate. The extrudate was cooled by a water trough and then the strands were pelletized.

Pigments: Silver Frost Color Concentrate: 5 parts medium aluminum flake pigment (available from Siberline, Tamaua, Pa.), 4 parts by weight of a white pearlescent concentrate (available from EM Industries); 1 part by weight of fine-flake silver concentrate, 0.15 by weight of a white concentrate, and 0.08 parts by weight of a russet pearlescent concentrate. These are usually formed into a color concentrate pellet by a color house.

Material Properties:
a) Transparency of at least 80% as measured by ASTM D1003
b) Haze value less than 10% as measured by ASTM D1003
c) High gloss of +90% as measured by a gloss meter
d) Excellent scratch resistance of a rating of 2 (visible line) using a 1 mm pin and a 7 N force tested to the Abrasion Resistance Spec: LP-463PB-54-01
e) Excellent UV protection a DE reading of <1.0 tested to SAE J1960
f) Excellent chemical resistance with a DE<1.0 tested to MS-JP9-8
g) Excellent CLTE of $6 \times 10^{-5}$ mm/mm as tested to ASTM E228
h) Low mold shrinkage of <0.8% tested to ISO 2577

Processing: The transparent/low haze polymer composition blend is used at 100 parts to 14 parts of the silver frost color concentrate. The two components, transparent/low haze polymer composition and color concentrate pellet are then blended together and then introduced into the extruder which would has the following profile: zone 1: 410 F, zone 2: 420 F, zone 3: 430 F, zone 4: 440 F. To achieve a highly glossy surface on the bodyside molding, the profile die has a very high quality steel and be polished up to an A-3 level. After the bodyside molding has been extruded, the extrudate should go immediately into a trough of cold water to freeze the surface and cool down the bodyside molding.

EXAMPLE 4

Preparation of an Automotive Interior Climate Control Bezel

The following materials were weighed into a 55 gallon drum, and then put onto a drum tumbler for 20 minutes: 96.6% by weight of Achieve 3854 (a metallocene-catalyzed polypropylene available from ExxonMobil); 1.0% EXXELOR PO 1020 (a coupling agent available from ExxonMobil); 1.0% I.30P (a nanocomposite available from Nanocor); 0.2% NA-21 (a nucleating agent available from Amfine); 1.0% of Endex 2650 (a endothermic foaming agent from Endex Polymer Additives), 0.2% Cyasorb 2337 (available from Cytech Industries); 0.2% Cyasorb 3529 (available from Cytech Industries); 0.4% Cyasorb 3853PP (available from Cytech Industries); 0.05% Cyanox 1741 (available from Cytech Industries); 0.05% GE 641 (available from GE).

The pellet/powder mix was then batch fed into one feeder into a 46 mm BUSS Kneader compounding extruder. The BUSS Kneader was set up as follows: zone 1:155 C, zone 2: 160 C, zone 3: 165 C, zone 4: 170 C. The torque reader was at 50%. The materials melted together, and produced high transparent, low haze extrudate. The extrudate was cooled by a water trough and then the strands were pelletized.

Pigments: Silver Frost Color Concentrate: 5 parts medium aluminum flake pigment (available from Siberline, Tamaua, Pa.), 4 parts by weight of a white pearlescent concentrate (available from EM Industries); 1 part by weight of fine-flake silver concentrate, 0.15 by weight of a white concentrate, and 0.08 parts by weight of a russet pearlescent concentrate. These would be formed into a color concentrate pellet by a color house.

Material Properties:
a) Transparency of at least 80% as measured by ASTM D1003
b) Haze value less than 10% as measured by ASTM D1003
c) High gloss of +90% as measured by a gloss meter
d) Excellent scratch resistance of a rating of 2 (visible line) using a 1 mm pin and a 7 N force tested to the Abrasion Resistance Spec: LP-463PB-54-01
e) Excellent UV protection a DE reading of <=1.0 tested to SAE J1960
f) Excellent chemical resistance with a DE<1.0 tested to MS-JP9-8
g) Excellent CLTE of $6\times10^{-5}$ mm/mm as tested to ASTM E228
h) Low mold shrinkage of <0.8% tested to ISO 2577

Processing: The transparent/low haze polymer composition blend is used at 100 parts to 14 parts of the silver frost color concentrate. The two components, transparent/low haze polymer composition and the color concentrate pellet are then blended together and then introduced into an injection molding machine which would have the following profile: zone 1: 410 F, zone 2: 420 F, zone 3: 430 F, zone 4: 440 F, nozzle temperature: 450 F. To achieve the desired gloss level on the bezel, the mold should be polished to the desired gloss level. The mold temperature should be 90–100F. The cycle time has been 90 seconds.

The present invention provides:

1. An exterior automotive vehicle component comprising a polybutene-1 homo or co-polymer modified polyolefin having a haze level of less than about 10% and a transmission (luminous transmittance) of at least 80% with special effects pigments uniformly distributed therein.

2. Preferably the exterior automotive vehicle component comprises of a blend of an aliphatic polyolefin resin and a polybutene.

3. Preferably the exterior automotive vehicle component comprises of a blend of an aliphatic polyolefin resin and a polybutene, and a coupling agent.

4. Preferably the exterior automotive vehicle component comprises of a blend of an aliphatic polyolefin resin, a polybutene, a coupling agent, and a nanocomposite.

5. Preferably the exterior automotive vehicle component and transparent pigment are evenly mixed.

6. The exterior automotive vehicle component when secured next to a painted surface of an automobile significantly color matches that painted surface.

7. A non-automotive component which is color matched to a paint chip.

8. A method of recycling an exterior automotive vehicle component as previously described which comprises:
securing an exterior bodyside cladding component of an automotive vehicle;
removing the exterior bodyside cladding component from the automotive vehicle;
grinding the exterior bodyside cladding to "fines"; and
re-forming the "fines" into another shape by injection molding It is intended that the foregoing description be only illustrative of the present invention and that the present invention be limited only by the hereinafter appended claims.

I claim:

1. A thermoplastic composition substantially free of elastomers which comprises in admixture:

(a) a crystalline polybutene-1 polymer in an amount between about 0.1 and 20% by weight having haze of less than 10% and luminous transmittance of at least 80% as measured by ASTM D1003 95;

(b) a crystalline polyolefin polymer of a $C_2$ to $C_{20}$ olefin monomer other than the polybutene-1 polymer having the haze of less than about 10% and the luminous transmittance of at least about 80% as measured by ASTM D1003 95;

(c) an exfoliated layered inorganic nanocomposite derived from a precursor nanocomposite with nanolayers and galleries between the nanolayers in an amount between about 0.1 and 5% by weight, wherein the nanocomposite has been exfoliated by (a), (b) or a mixture of (a) and (b);

(d) a coupling agent which couples (a), (b) and (c) together without significantly increasing the haze or reducing the luminous transmittance of the composition in an amount up to about 10% by weight, wherein the composition when molded without pigments has the haze of at least 10% and the luminous transmittance of at least 80%.

2. The composition of claim 1 wherein the polyolefin is polypropylene.

3. The composition of claim 1 containing a color pigment.

4. The composition of claim 1 or 2 as a molded product.

5. The composition of claim 1 or 2 as a body part for a vehicle.

6. The composition of claim 1 or 2 as a body part for a vehicle which duplicates a paint color of the vehicle.

7. The composition of any one of claims 2 or 3 wherein the precursor nanocomposite contains an exfoliating agent which is an organic onium ion for exfoliation by (a) and (b).

8. The composition of claim 1 or 2 wherein the precursor nanocomposite contains an exfoliating agent which links the exfoliated nanocomposite to (a) and (b).

9. The composition of claim 1 or 2 wherein the nanocomposite has a particle size of between about 1 and 100 microns.

10. The composition of claim 1 or 2 which is as pellets formable into a molded product.

11. The composition of claim 1 wherein the precursor nanocomposite is a 2:1 layered silicate with a particle size between about 1 and 100 nanometers containing an organic quaternary ammonium ion between the layers.

12. The composition of any one of claims 2 or 3 wherein a nucleating agent is provided to facilitate crystallinity when the composition is molded.

13. The composition of any one of claims 1, 2 or 3 wherein the coupling agent is a polymer of a carboxylic anhydride.

14. The composition of any one of claims 1, 2 or 3 wherein the coupling agent is a grafted polymer of maleic anhydride.

15. The composition of any one of claims 1, 2 or 3 wherein the nanocouple comprises a surface modified montmorillonite.

16. The composition of claims 1, 2 or 3 wherein the coupling agent is a grafted polymer of a carboxylic anhydride and the nanocomposite comprises a surface modified montmorillonite.

17. The composition of any one of claims 1, 2 or 3 wherein the coupling agent is a grafted polymer of maleic anhydride and the nanocomposite comprises surface modified montmorillonite.

* * * * *

UNITED STATES PATENT AND TRADEMARK OFFICE
CERTIFICATE OF CORRECTION

PATENT NO. : 6,753,373 B2
DATED : June 22, 2004
INVENTOR(S) : Kris W. Winowiecki It is certified that error appears in the above-identified patent and that said Letters Patent is hereby corrected as shown below:

Column 5,
Line 59, "D-0003-95 is also" should be -- D-1003-95 is also --.

Column 8,
Line 11, "Ziegler-Natter" should be -- Ziegler-Nather --.

Column 14,
Line 21, "46 mm BUS Kneader" should be -- 46 mm BUSS Kneader --.

Column 16,
Line 65, "claims 2 or 3" should be -- claims 1, 2 or 3 --.

Column 17,
Line 13, "claims 2 or 3" should be -- claims 1, 2 or 3 --.

Signed and Sealed this

Eighth Day of February, 2005

JON W. DUDAS
*Director of the United States Patent and Trademark Office*